US008253991B2

(12) United States Patent
Wang et al.

(10) Patent No.: US 8,253,991 B2
(45) Date of Patent: Aug. 28, 2012

(54) DUPLEX SCANNING APPARATUS

(75) Inventors: Chung-Kai Wang, Taipei (TW); Cai-Rong Liao, Guangzhou (CN); San-Xi Chu, Guangzhou (CN)

(73) Assignee: Primax Electronics Ltd., Taipei (TW)

( * ) Notice: Subject to any disclaimer, the term of this patent is extended or adjusted under 35 U.S.C. 154(b) by 428 days.

(21) Appl. No.: 12/633,620

(22) Filed: Dec. 8, 2009

(65) Prior Publication Data

US 2011/0096378 A1 Apr. 28, 2011

(30) Foreign Application Priority Data

Oct. 23, 2009 (TW) .............................. 98135897 A

(51) Int. Cl.
*H04N 1/04* (2006.01)

(52) U.S. Cl. ......... 358/474; 358/461; 358/498; 358/497

(58) Field of Classification Search .................. 358/474, 358/461, 498, 497, 496, 483, 482
See application file for complete search history.

(56) References Cited

U.S. PATENT DOCUMENTS 5,091,654 A * 2/1992 Coy et al. ................ 250/559.29
6,353,486 B1 * 3/2002 Tsai .............................. 358/474

* cited by examiner

*Primary Examiner* — Houshang Safaipour
(74) *Attorney, Agent, or Firm* — Kirton McConkie; Evan R. Witt

(57) ABSTRACT

A duplex scanning apparatus includes an automatic document feeder and a flatbed scanner. The automatic document feeder includes a first scanning module. The flatbed scanner includes a second scanning module and a first calibration plate. The first calibration plate is disposed on the second scanning module, and includes a calibration plate first end, a calibration plate second end and a calibration plate middle part. A first included angle is defined between the calibration plate first end and the calibration plate middle part, and a second included angle is defined between the calibration plate second end and the calibration plate middle part. As such, each of a distance between the calibration plate first end and the first scanning module and a distance between the calibration plate second end and the first scanning module is shorter than a distance between the calibration plate middle part and the first scanning module.

9 Claims, 4 Drawing Sheets

DUPLEX SCANNING APPARATUS

FIELD OF THE INVENTION

The present invention relates to a scanning apparatus, and more particularly to a scanning apparatus having a scanning calibration function.

BACKGROUND OF THE INVENTION

Scanning apparatuses are widely used for scanning images of documents. The scanned images can be converted into electronic files, which are then stored, processed or spread. With increasing development of scanning technologies, the scanning apparatuses have experienced great growth and are now rapidly gaining in popularity.

In the early stage, the scanning apparatus could scan one side of the document. For scanning both sides of the document, after one side of the document has been scanned, the document should be manually turned over so as to scan the other side of the document. As known, the process of manually turning over the document is troublesome. Recently, an automatic document feeder is usually integrated into the scanning apparatus. After a stack of documents to be scanned are placed on the sheet input tray of the automatic document feeder, the sheet-feeding mechanism of the automatic document feeder will successively transport the sheet to perform the scanning operation without the need of manually turning over the documents. This means of automatically feeding the sheet sheets is both time-saving and efficient. It is found that the scanning apparatuses are improved according to the generation development and the diverse demands.

Generally, a scanning apparatus has a calibration plate for performing a calibrating operation to correct the errors resulted from the optical and electronic system of the scanning apparatus before a scanning operation is performed. The optical and electronic system includes for example a light source, a lens and an optical sensing element. The calibrating operation includes for example a color calibrating operation, a brightness calibrating operation or a contrast calibrating operation.

FIG. 1 is a schematic view illustrating a conventional duplex scanning apparatus. As shown in FIG. 1, the duplex scanning apparatus 1 comprises an automatic document feeder 10 and a flatbed scanner 11. The automatic document feeder 10 comprises a first scanning module 101, a sheet input tray 102 and a sheet ejecting tray 103. The flatbed scanner 11 comprises a second scanning module 111, a glass platform 112, a first calibration plate 113, a second calibration plate 114 and a transmission mechanism 115.

Take the color calibrating operation for example. The first calibration plate 113 and the second calibration plate 114 are standard white reference plates or standard black reference plates. For example, as shown in FIG. 1, the first calibration plate 113 and the second calibration plate 114 are standard white reference plates. Before the duplex scanning operation is performed, a document (not shown) is placed on the sheet input tray 102 of the automatic document feeder 10. Then, a light beam emitted from a linear light source (not shown) of the first scanning module 101 is projected on the first calibration plate 113. As such, a standard white value related to the first calibration plate 113 is acquired by the duplex scanning apparatus 1. The standard reference value is used as the standard of white color. Similarly, the second scanning module 111 that is connected with the transmission mechanism 115 is moved by the transmission mechanism 115 to the location under the second calibration plate 114. Then, a light beam emitted from a linear light source (not shown) of the second scanning module 111 is projected on the second calibration plate 114 through the glass platform 112. As such, a standard white value related to the second calibration plate 114 is acquired by the duplex scanning apparatus 1. By using the first calibration plate 113 and the second calibration plate 114 as the standard white reference plates, the duplex scanning apparatus 1 could perform calibrating compensation for the image to be scanned.

The process of performing the calibrating compensation by the duplex scanning apparatus 1, however, still has some drawbacks. For examples, due to the limited intensity of the light beam, the effective projecting distance of the light beam is restricted. During the color calibrating operation of the duplex scanning apparatus 1 is performed, the light beam emitted from the second scanning module 111 is propagated to the second calibration plate 114 by a first distance D1, wherein the first distance D1 is within the effective distance required for obtaining a sharp image. In other words, the result of the color calibrating operation of the second scanning module 111 is satisfactory. On the other hand, light beam emitted from the first scanning module 101 is propagated to the first calibration plate 113 by a second distance D2 longer than the first distance D1. Since the second distance D2 exceeds the effective distance required for obtaining the sharp image, the scanning quality is deteriorated. Moreover, since the intensity of the light beam emitted from both ends of the linear light source is weaker, the brightness of the light beam projected on the middle part of the first calibration plate 113 is usually higher than the brightness of the light beam projected on the both ends of the first calibration plate 113. Under this circumstance, the middle part of the first calibration plate 113 is darker than each of the both ends of the first calibration plate 113. When the brightness at the both ends of the image is compensated by the first scanning module 101, the image corresponding to the both ends of the linear light source is usually over-compensated by the duplex scanning apparatus 1. Since the image corresponding to the both ends of the linear light source is too bright, the scanning quality of the duplex scanning apparatus 1 is deteriorated. Therefore, there is a need of providing a duplex scanning apparatus for correcting the calibration error.

SUMMARY OF THE INVENTION

It is an object of the present invention to provide a duplex scanning apparatus for correcting the calibration error.

In accordance with an aspect of the present invention, there is provided a duplex scanning apparatus for scanning a document to obtain a document image. The duplex scanning apparatus includes an automatic document feeder and a flatbed scanner. The automatic document feeder is used for feeding the document, and includes a first scanning module. When the document is fed by the automatic document feeder, the first scanning module scans a second side of the document, thereby obtaining a second-side image of the document image. The flatbed scanner is disposed under the automatic document feeder. The flatbed scanner includes a glass platform, a second scanning module, a first calibration plate and a second calibration plate. The glass platform is used for placing the document. The second scanning module is used for scanning a first side of the document, thereby obtaining a first-side image of the document image. The first calibration plate is disposed on the second scanning module, and includes a calibration plate first end, a calibration plate second end and a calibration plate middle part. A first included angle is defined between the calibration plate first end and the calibration plate middle part, and a second included angle is defined between the calibration plate second end and the calibration plate middle part. As such, each of a distance between the calibration plate first end and the first scanning module and a distance between the calibration plate second end and the first scanning module is shorter than a distance between the calibration plate middle part and the first scanning module. The second calibration plate is disposed on the glass platform.

In an embodiment, the flatbed scanner further includes a transmission mechanism. The transmission mechanism is connected with the second scanning module for providing motive power to move the second scanning module such that the transmission mechanism is moved on the glass platform.

In an embodiment, the second scanning module further includes a base for supporting the first calibration plate, and the base includes a base first end, a base second end and a base middle part. A third included angle is defined between the base first end and the base middle part. A fourth included angle is defined between the base second end and the base middle part. The third included angle is equal to the first included angle. The fourth included angle is equal to the second included angle. As such, the calibration plate first end, the calibration plate second end and the calibration plate middle part are respectively placed on the base first end, the base second end and the base middle part.

In an embodiment, the third included angle is equal to the fourth included angle.

In an embodiment, the first scanning module further includes a first light source for emitting a first light beam and projecting the first light beam on the first calibration plate or the second side of the document, a plurality of first reflective mirrors for reflecting the first light beam, a first lens for focusing the first light beam, and a first optical sensing element for receiving the first light beam, thereby generating the second-side image of the document image.

In an embodiment, the first optical sensing element includes a charge coupled device (CCD).

In an embodiment, the second scanning module further includes a second light source for emitting a second light beam and projecting the second light beam on the second calibration plate or the first side of the document, a plurality of second reflective mirrors for reflecting the second light beam, a second lens for focusing the second light beam, and a second optical sensing element for receiving the second light beam, thereby generating the first-side image of the document image.

In an embodiment, the second optical sensing element includes a charge coupled device (CCD).

In an embodiment, the first included angle is equal to the second included angle.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
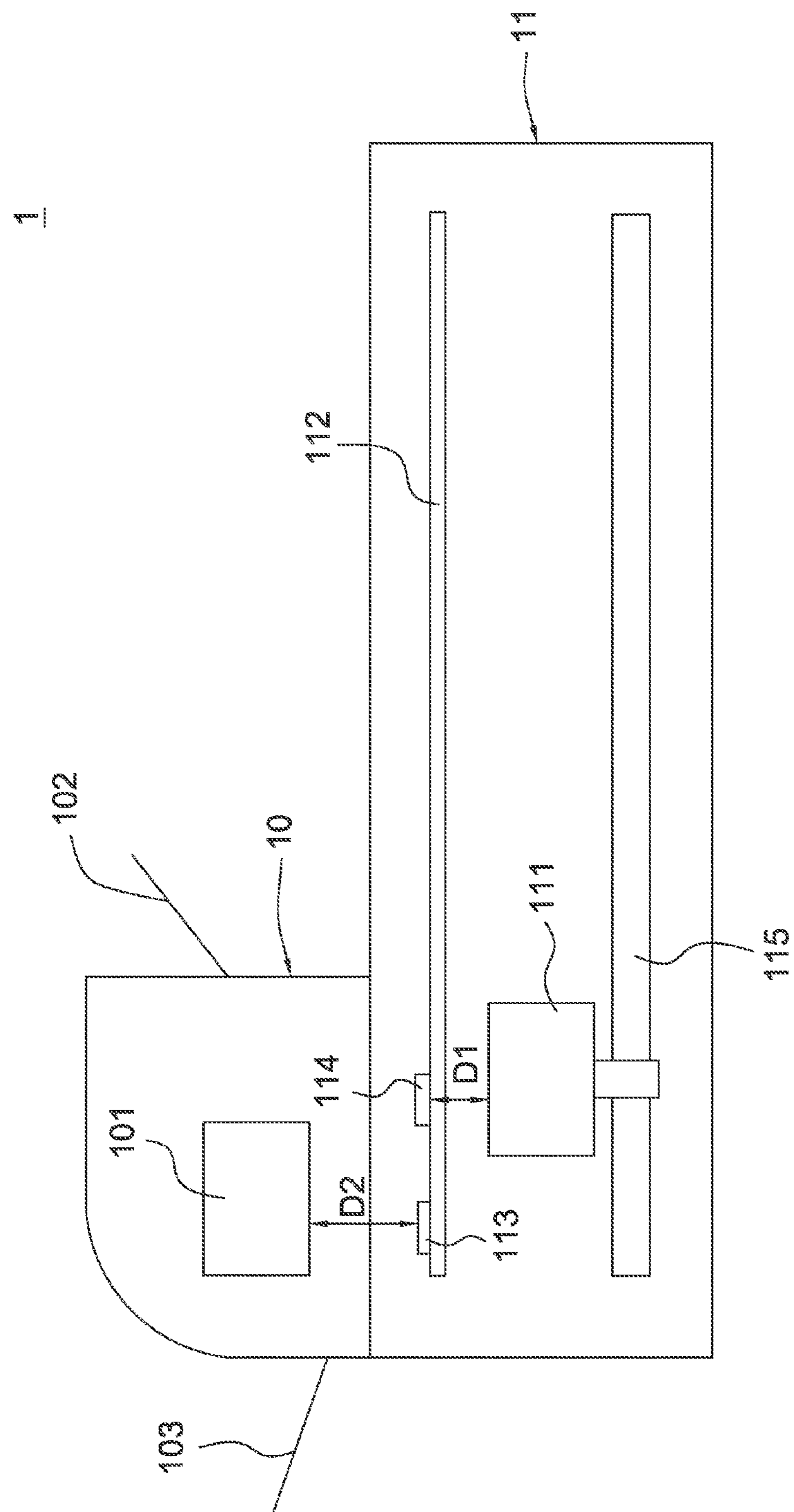
FIG. 1 is a schematic view illustrating a conventional duplex scanning apparatus.
Figure 2:
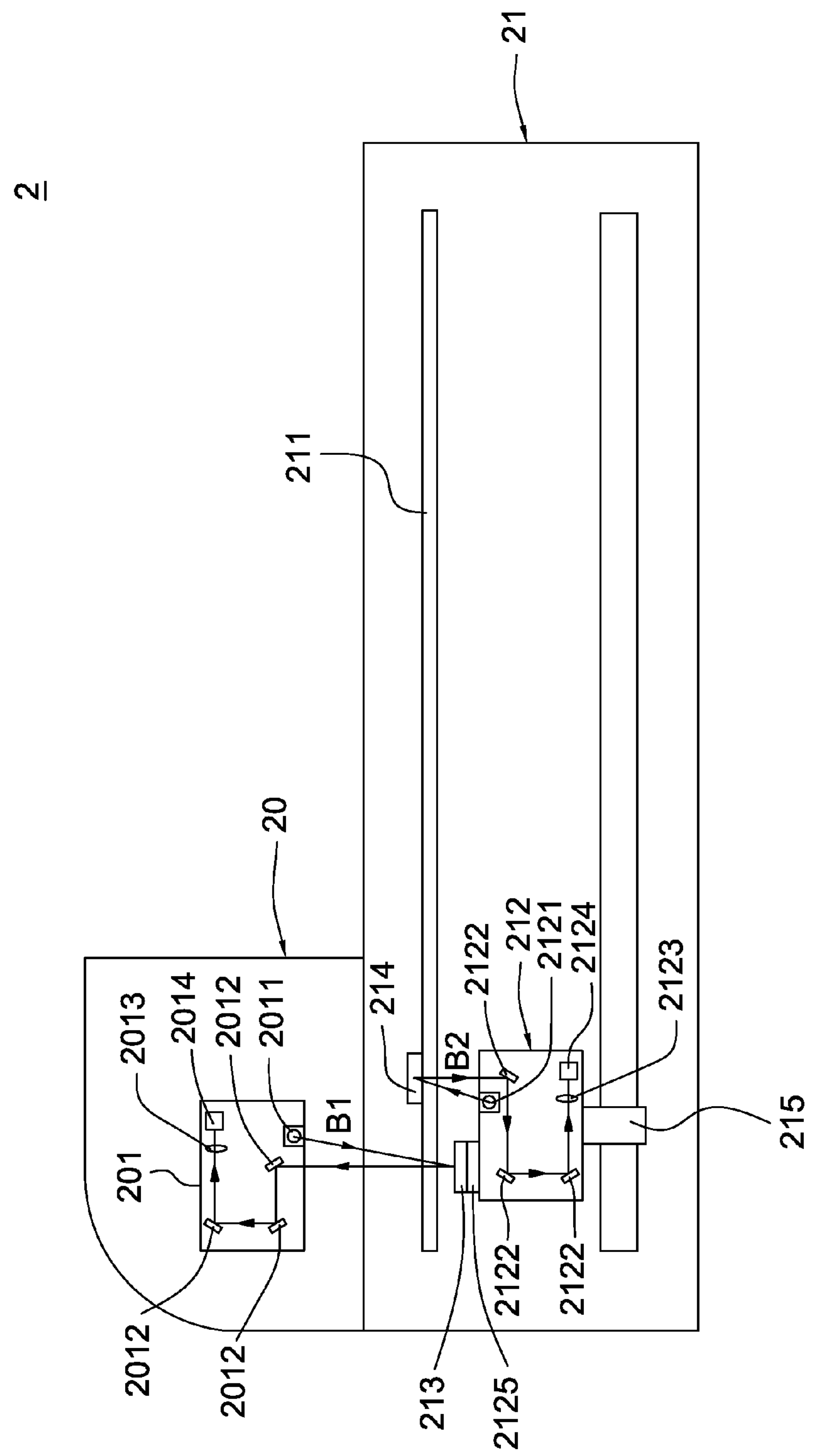
FIG. 2 is a schematic view illustrating a duplex scanning apparatus according to an embodiment of the present invention.

For obviating the drawbacks encountered from the prior art, the present invention provides a duplex scanning apparatus for correcting the calibration error. FIG. 2 is a schematic view illustrating a duplex scanning apparatus according to an embodiment of the present invention. The duplex scanning apparatus is used for scanning a document (not shown), thereby obtaining a document image. As shown in FIG. 2, the duplex scanning apparatus 2 comprises an automatic document feeder 20 and a flatbed scanner 21. The automatic document feeder 20 is disposed under the flatbed scanner 21 for feeding the document. The automatic document feeder 20 comprises a first scanning module 201. When the document is fed by the automatic document feeder 20, the first scanning module 201 scans a second side of the document, thereby obtaining a second-side image of the document image. The flatbed scanner 21 comprises a glass platform 211, a second scanning module 212, a first calibration plate 213, a second calibration plate 214 and a transmission mechanism 215. In a case that the duplex scanning apparatus 2 is used for performing a single-side scanning operation, the document is placed on the glass platform 211. The second scanning module 212 is used for scanning a first side of the document, thereby obtaining a first-side image of the document image. The first calibration plate 213 is placed on the second scanning module 212. The second calibration plate 214 is placed on the glass platform 211. In this embodiment, the second scanning module 212 has a base 2125 for supporting the first calibration plate 213. In particular, the first calibration plate 213 is fixed on the base 2125 by a fastening or adhering means.

Please refer to FIG. 2 again. In the automatic document feeder 20, the first scanning module 201 comprises a first light source 2011, a plurality of first reflective mirrors 2012, a first lens 2013 and a first optical sensing element 2014. In this embodiment, the first light source 2011 is a liner light source. An example of the first optical sensing element 2014 includes a charge coupled device (CCD). A first light beam B1 emitted from the first light source 2011 is projected on the first calibration plate 213 during the calibrating compensation is performed. Alternatively, the first light beam B1 is projected on the second side of the document during the scanning operation is performed. The first light beam B1 is reflected by the first reflective mirrors 2012 and then focused by the first lens 2013. After the focused first light beam B1 is received by the first optical sensing element 2014, the first optical sensing element 2014 generates the second-side image of the document image.

In the flatbed scanner 21, the second scanning module 212 comprises a second light source 2121, a plurality of second reflective mirrors 2122, a second lens 2123 and a second optical sensing element 2124. In this embodiment, the second light source 2121 is a liner light source. An example of the second optical sensing element 2124 includes a charge coupled device (CCD). A second light beam B2 emitted from the second light source 2121 is projected on the second calibration plate 214 during the calibrating compensation is performed. Alternatively, the second light beam B2 is projected on the first side of the document during the scanning operation is performed. The second light beam B2 is reflected by the second reflective mirrors 2122 and then focused by the second lens 2123. After the focused second light beam B2 is received by the second optical sensing element 2124, the second optical sensing element 2124 generates the first-side image of the document image.

Before the scanning operation of the second scanning module 212 is performed, calibrating compensation of the second scanning module 212 should be done. During the calibrating compensation, the second scanning module 212 is moved by the transmission mechanism 215 to the location under the second calibration plate 214. Then, the second light beam B2 emitted from the second light source 2121 is projected on the second calibration plate 214. The second light beam B2 is reflected by the second calibration plate 214 to be directed into the second scanning module 212. Then, the second light beam B2 is reflected by the second reflective mirrors 2122, focused by the second lens 2123, and received by the second optical sensing element 2124. As such, a standard white value related to the second calibration plate 214 is acquired. The process of performing the calibrating compensation of the first scanning module 201 will illustrated later.

Figure 3:
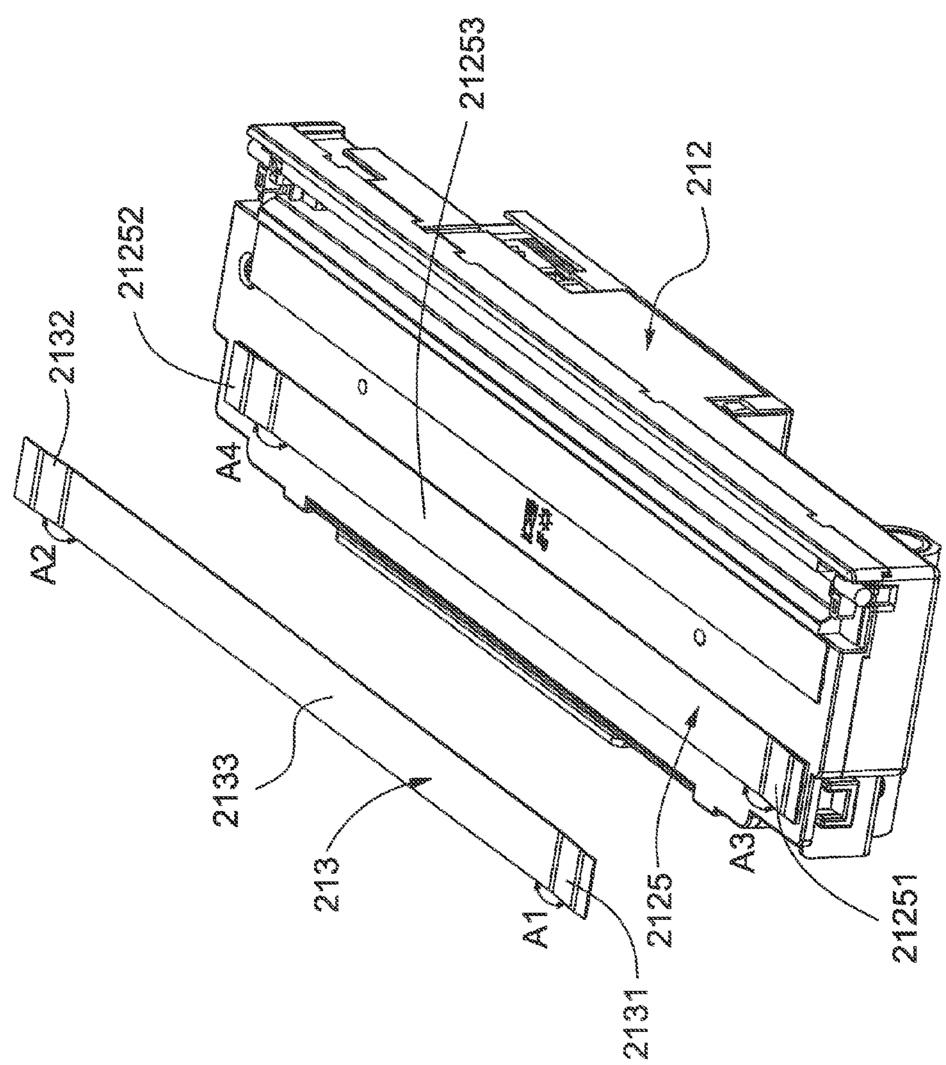
FIG. 3 is a partially schematic exploded view illustrating a second scanning module of a duplex scanning apparatus according to an embodiment of the present invention.

FIG. 3 is a partially schematic exploded view illustrating a second scanning module of a duplex scanning apparatus according to an embodiment of the present invention. As shown, the base 2125 is disposed on the second scanning module 212, and the first calibration plate 213 is supported on the base 2125. The first calibration plate 213 comprises a calibration plate first end 2131, a calibration plate second end 2132 and a calibration plate middle part 2133. A first included angle A1 is defined between the calibration plate first end 2131 and the calibration plate middle part 2133. A second included angle A2 is defined between the calibration plate second end 2132 and the calibration plate middle part 2133. In this embodiment, the first included angle A1 is equal to the second included angle A2. The base 2125 comprises a base first end 21251, a base second end 21252 and a base middle part 21253. A third included angle A3 is defined between the base first end 21251 and the base middle part 21253. A fourth included angle A4 is defined between the base second end 21252 and the base middle part 21253. The third included angle A3 is equal to the first included angle A1, and the fourth included angle A4 is equal to the second included angle A2.

Figure 4:
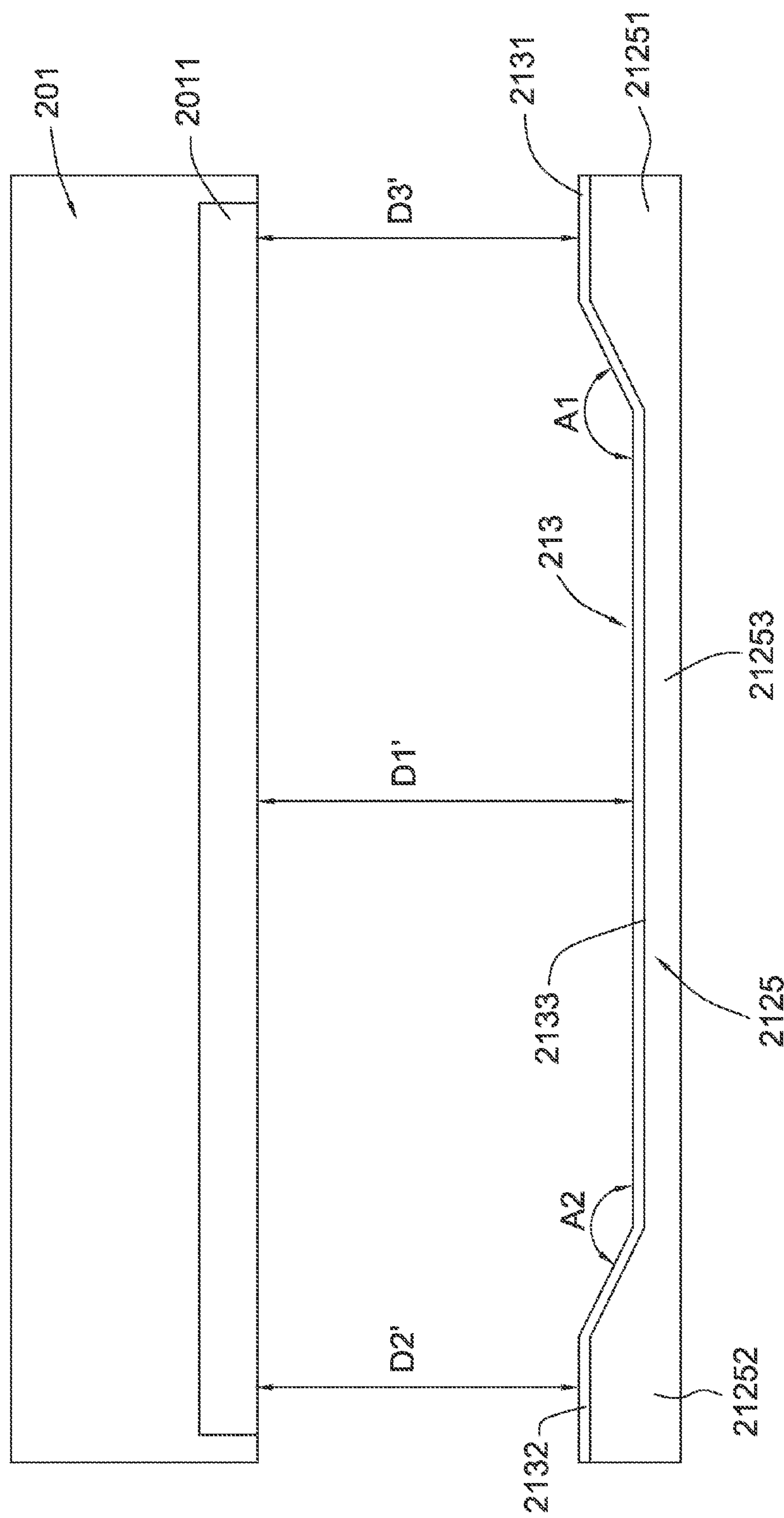
FIG. 4 is a partially schematic view illustrating a first scanning module and first calibration plate of a duplex scanning apparatus according to an embodiment of the present invention.

Since the third included angle A3 is equal to the first included angle A1 and the fourth included angle A4 is equal to the second included angle A2, after the first calibration plate 213 is placed on the base 2125, the calibration plate first end 2131 is arranged on the base first end 21251, the calibration plate second end 2132 is arranged on the base second end 21252, and the calibration plate middle part 2133 is arranged on the base middle part 21253 (see FIG. 4).

FIG. 4 is a partially schematic view illustrating a first scanning module and first calibration plate of a duplex scanning apparatus according to an embodiment of the present invention. As shown in FIG. 4, the first calibration plate 213 is placed on the base 2125. Since the second included angle A2 is defined between the calibration plate second end 2132 and the calibration plate middle part 2133, the distance D2' between the calibration plate second end 2132 and the first scanning module 201 is shorter than the distance D1' between the calibration plate middle part 2133 and the first scanning module 201. Similarly, since the first included angle A1 is defined between the calibration plate first end 2131 and the calibration plate middle part 2133, the distance D3' between the calibration plate first end 2131 and the first scanning module 201 is also shorter than the distance D1' between the calibration plate middle part 2133 and the first scanning module 201. That is, since the both ends of the first calibration plate 213 are raised, the calibration plate first end 2131 and the distance calibration plate second end 2132 are closer to the first scanning module 201. Even if the intensity of the first light beam B1 emitted from the both ends of the first light source 2011 is relatively weaker, the intensity of the first light beam B1 is compensated by the shortened distances between the both ends of the first light source 2011 and the both ends of the first calibration plate 213, so that the first light beam B1 could be effectively projected on the calibration plate first end 2131 and distance calibration plate second end 2132.

By the way, the first included angle A1 and the second included angle A2 are acquired according to a series of optical simulating processes. In every optical simulating process, the included angles are adjusted, the standard white values provided by the calibration plate first end 2131, the calibration plate second end 2132 and the calibration plate middle part 2133 are respectively recorded, and the differences between these three standard white values are compared. After undue optical simulating processes, the first included angle A1 and the second included angle A2 corresponding to the minimum differences between these three standard white values will be acquired. After the first included angle A1 and the second included angle A2 are properly acquired, the brightness values of the first light beam B1 on the calibration plate first end 2131, the calibration plate second end 2132 and the calibration plate middle part 2133 of the first calibration plate 213 are identical. Under this circumstance, the error resulted from the calibrating compensation of the first scanning module 201 will be eliminated.

From the above description, the duplex scanning apparatus of the present invention is capable of correcting the calibration error by using the first calibration plate 213. Due to the specific design of the first calibration plate 213, the calibrating compensation of the first scanning module 201 could be precisely performed. Moreover, since the first calibration plate 213 is detachably disposed on the base 215, the first calibration plate 213 could be replaced as required. In comparison with the conventional technology, the duplex scanning apparatus of the present invention has enhanced calibrating compensation efficacy in order to achieve better scanning performance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex scanning apparatus for scanning a document to obtain a document image, said duplex scanning apparatus comprising:

- an automatic document feeder for feeding said document, said automatic document feeder comprising a first scanning module, wherein when said document is fed by said automatic document feeder, said first scanning module scans a second side of said document, thereby obtaining a second-side image of said document image; and
- a flatbed scanner disposed under said automatic document feeder, and comprising:
  - a glass platform for placing said document;
  - a second scanning module for scanning a first side of said document, thereby obtaining a first-side image of said document image;
  - a first calibration plate disposed on said second scanning module, and comprising a calibration plate first end, a calibration plate second end and a calibration plate middle part, wherein a first included angle is defined between said calibration plate first end and said calibration plate middle part, and a second included angle is defined between said calibration plate second end and said calibration plate middle part, so that each of a distance between said calibration plate first end and said first scanning module and a distance between said calibration plate second end and said first scanning module is shorter than a distance between said calibration plate middle part and said first scanning module; and a second calibration plate disposed on said glass platform.

2. The duplex scanning apparatus according to claim 1 wherein said flatbed scanner further comprises a transmission mechanism, and said transmission mechanism is connected with said second scanning module for providing motive power to move said second scanning module such that said transmission mechanism is moved on said glass platform.

3. The duplex scanning apparatus according to claim 1 wherein said second scanning module further comprises a base for supporting said first calibration plate, and said base comprises a base first end, a base second end and a base middle part, wherein a third included angle is defined between said base first end and said base middle part, a fourth included angle is defined between said base second end and said base middle part, said third included angle is equal to said first included angle, and said fourth included angle is equal to said second included angle, so that said calibration plate first end, said calibration plate second end and said calibration plate middle part are respectively placed on said base first end, said base second end and said base middle part.

4. The duplex scanning apparatus according to claim 3 wherein said third included angle is equal to said fourth included angle.

5. The duplex scanning apparatus according to claim 1 wherein said first scanning module further comprises:

a first light source for emitting a first light beam and projecting said first light beam on said first calibration plate or said second side of said document;

a plurality of first reflective mirrors for reflecting said first light beam;

a first lens for focusing said first light beam; and a first optical sensing element for receiving said first light beam, thereby generating said second-side image of said document image.

6. The duplex scanning apparatus according to claim 5 wherein said first optical sensing element includes a charge coupled device (CCD).

7. The duplex scanning apparatus according to claim 1 wherein said second scanning module further comprises:

a second light source for emitting a second light beam and projecting said second light beam on said second calibration plate or said first side of said document;

a plurality of second reflective mirrors for reflecting said second light beam;

a second lens for focusing said second light beam; and a second optical sensing element for receiving said second light beam, thereby generating said first-side image of said document image.

8. The duplex scanning apparatus according to claim 7 wherein said second optical sensing element includes a charge coupled device (CCD).

9. The duplex scanning apparatus according to claim 1 wherein said first included angle is equal to said second included angle.

* * * * *